(12) United States Patent
Kaltenberger (10) Patent No.: US 11,493,434 B2
(45) Date of Patent: Nov. 8, 2022

(54) METHOD FOR VISUALIZING SPECTRAL DATA AS AN IMAGE, DATA PROCESSING DEVICE AND COMPUTER-READABLE STORAGE MEDIUM

(71) Applicant: Rohde & Schwarz GmbH & Co. KG, Munich (DE)

(72) Inventor: Andreas Kaltenberger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 961 days.

(21) Appl. No.: 16/191,029

(22) Filed: Nov. 14, 2018

(65) Prior Publication Data

US 2020/0150029 A1    May 14, 2020

(51) Int. Cl.
  *G01N 21/25* (2006.01)
  *G06T 11/20* (2006.01)
  *G01J 3/28* (2006.01)

(52) U.S. Cl.
  CPC ............ *G01N 21/25* (2013.01); *G01J 3/2823* (2013.01); *G06T 11/206* (2013.01)

(58) Field of Classification Search
  CPC . G01N 21/25; G01J 3/2823; G01J 2003/2826
  See application file for complete search history.

(56) References Cited

U.S. PATENT DOCUMENTS

2011/0190648 A1\* 8/2011 Gu .......................... A61B 5/366
  600/509

OTHER PUBLICATIONS

Fangjian Xing,"Ultrafast Three-Dimensional Surface Imaging Based on Short-Time Fourier Transform", 21, Nov. 1, 2015 (Year: 2015).\*
Masahiro Tsuchiya "Wavevector Mapping for Antenna Emission by Fourier Transform of Complex Electrooptic Images" 2013 IEEE (Year: 2013).\*
Digital Image Basics "Image Compression: How Math Led to the JPEG2000 Standard", www.whydomath.org/node/wavlets/imagebasics. html 2011 (Year: 2011).\*
Stanford, "Image-1 Introduction to Digital Images", https://web.stanford.edu/class/cs101/image-1-introduction.html Aug. 5, 2015 (Year: 2015).\*
Matlab, "RGB image representation",https://www.geeksforgeeks.org/matlab-rgb-image-representation/, Jun. 26, 2018 (Year: 2018).\*

\* cited by examiner

*Primary Examiner* — Maurice C Smith
(74) *Attorney, Agent, or Firm* — Christensen O'Connor Johnson Kindness PLLC (57) ABSTRACT

A method for visualizing a data set as an image on a display having an x-axis and a y-axis is described. The data set comprises a plurality of values, each value of the plurality of values being associated to a respective point in a first dimension and a respective point in a second dimension, wherein the first dimension and the second dimension are assigned to the x-axis and the y-axis, respectively. A first resolution value for the image in the direction of the x-axis, and a second resolution value for the image in the direction of the y-axis are provided, wherein the first resolution value and the second resolution value are independent from each other. Based on the first resolution value and the second resolution value, the image is calculated as a representation of the data set. Further, a data processing device and a computer-readable storage medium are described.

15 Claims, 8 Drawing Sheets

METHOD FOR VISUALIZING SPECTRAL DATA AS AN IMAGE, DATA PROCESSING DEVICE AND COMPUTER-READABLE STORAGE MEDIUM

TECHNICAL FIELD

Embodiments of the present disclosure generally relate to a method for visualizing a data set as an image. Some embodiments relate to a method for visualizing spectral data of a radiofrequency signal as an image.

BACKGROUND

Generally, any signal that varies over time has a corresponding spectrum which can be visualized. For example, visualization of the frequency spectrum of a radiofrequency signal (RF signal), or a high-frequency signal (HF signal), is useful when searching for previously unknown or undetected radiofrequency signals. When these signals are viewed in the form of a frequency spectrum, certain aspects of the detected signals or the underlying processes producing them are revealed.

The frequency spectrum of such a signal may be detected or measured by electronic instruments such as spectrum analyzers or signal analyzers by measuring the signal as it varies over time (time signal) and carrying out a Fourier transformation of the time signal, for instance. The result of the Fourier transformation is a distribution of amplitudes into frequency components composing the signal. Alternatively or additionally, a distribution of power and/or a distribution of energy may be obtained. That is, the distribution of power, energy or amplitude of a signal is frequency-dependent since it may be different for each frequency component constituting the signal. The distribution may additionally be time-dependent. The time and frequency dependent frequency spectrum of a signal may be represented or displayed as spectral data of the signal. The spectral data may comprise a plurality of values, wherein each value indicates, for at least one point in time, the amplitude, power or energy (or weight) associated to a respective frequency component among all frequency components constituting the signal under consideration. Thus, the spectral data have a time dimension and a frequency dimension.

In order to view or analyze the spectral data of a signal, the spectral data may be visualized. Typically, the spectral data is visualized by being displayed as a, for example two-dimensional, image (or diagram), wherein one axis or dimension of the image (or diagram) represents a point in time (the time axis) i.e. the time axis, and the other axis or dimension of the image (or diagram) represents the plurality of frequency components making up the signal (the frequency axis). The plurality of values associated to the points in time and the frequency components are represented by a plurality of pixels constituting the image.

In addition, the plurality of values may be represented by different gray levels of the pixels or in a color-coded form relating to a third dimension. That is, different values may be represented by different gray levels or different colors of the respective pixels.

The resolution of the image means how many values of the spectral data are represented by one single pixel of the image and may also be referred to as the zoom level of the image. The resolution of the image on the time axis thereof may be different from the resolution of the time axis thereof. In the related art, the image representing the spectral data is calculated as a whole and is only then displayed. Thus, when a user wants to zoom in or out on the image, the user has to wait until the image has been completely recalculated based on the new resolution even though the user is only interested in a part of the image. In other words, the user cannot smoothly zoom because the user has to wait for the image to be recalculated based on the new zoom level or resolution.

Accordingly, there is a need for an increase in the user experience and providing a method for visualizing spectral data of a radiofrequency signal.

SUMMARY

Embodiments of the present disclosure provide a method for visualizing a data set as an image on a display having an x-axis and a y-axis, the data set comprising a plurality of values, each value of the plurality of values being associated to a respective point in a first dimension and a respective point in a second dimension, wherein the first dimension and the second dimension are assigned to the x-axis and the y-axis, respectively. The method comprises the steps of:

providing a first resolution value for the image in the direction of the x-axis and a second resolution value for the image in the direction of the y-axis, wherein the first resolution value and the second resolution value are independent from each other, and calculating, based on the first resolution value and the second resolution value, the image as a representation of the data set.

Accordingly, the resolution of the calculated image in the respective dimensions can be set independently from each other due to the first and second resolution values being independent from each other. In other words, the zoom levels of the image with regard to the axes of the image may be set independently from each other or rather freely chosen by a user. Thus, it is possible to carry out the zooming only with regard to a single axis instead of zooming with regard to both axes simultaneously. This applies to the x-axis as well as the y-axis. Hence, the user is enabled to zoom in in a part of the image, for example one axis, that is of interest without changing the zoom level of the other axis.

Moreover, zooming may be done in both directions, namely with regard to both axes, whereas the ratio of the image displayed may be adapted during the zooming since the first and second resolution values are independent from each other. In other words, the image displayed is zoomed in differently for the x-axis than the y-axis or vice versa.

Put another way, the ratio of x-axis to y-axis (axes-ratio) of the image calculated is not fixed, but it can be chosen freely since the first and second resolution values are independent from each other so that at least one of the first resolution value and second resolution value may be 1 which corresponds to no zooming in the respective direction.

Each value of the data set may be assigned to three dimensions which are visualized by the direction of the x-axis, the direction of the y-axis and a color code of the image. Accordingly, a three-dimensional image may be calculated that may be displayed on a two-dimensional display having the x-axis and the y-axis, wherein the third dimension is provided by the color code. Thus, an image may be output that corresponds to a heat-map.

The value range of at least one of the x-axis and the y-axis may be unlimited. The data used for calculating the image may relate to data that can be displayed on unlimited axes. In fact, the axes are only limited by the respective data assigned to the axes. Accordingly, the respective axes are not limited by 90° or rather 180° which limits are typically used for map applications.

The image may comprise a plurality of pixels arranged in a matrix form in direction of the x-axis and in direction of the y-axis, wherein the first resolution value and the second resolution value are indicative of a number of values of the data set in the first dimension and in the second dimension, respectively, to be represented by each pixel in the calculated image, wherein the calculating step may comprise the steps of:

determining, for each pixel, a corresponding subset of values comprised in the data set, wherein a number of values comprised in the corresponding subset corresponds to a product of the first resolution value and the second dimension value, and calculating, for each pixel, a pixel value based on values comprised in the corresponding subset.

Generally, several values of the data set are used for calculating one pixel. The respective data set is split into subsets used for calculating the pixel to be displayed. In fact, the subset and therefore the number of values used for each pixel depend on the resolution values selected.

A pixel value may be calculated as an average of at least two values comprised in the corresponding subset. Alternatively, a pixel value may also be calculated as a minimum or a maximum value of the values comprised in the corresponding subset. Hence, a smooth image being the representation to be visualized can be calculated in an appropriate manner as at least two values may be averaged. Alternatively, only the minimum value or maximum value of the respective subset is taken into account. In fact, this may depend on the kind of data to be visualized.

In the determining step, two subsets of values corresponding to two pixels arranged adjacently to each other in the image may be determined to be adjacently arranged in the data set. This also ensures that a smooth image is calculated and no image errors occur.

The method may further comprise the step of displaying, by a display, the calculated image. A value of each pixel of the image may be displayed as at least one of a gray level and in a color-coded way. The displaying step may be implemented after the calculating step. Thereby, the calculated image representing the data set may be visualized to a user with the desired resolution so that the user may gather the respective information directly at the display.

The method may further comprise the step of storing, by a storage medium, the calculated image. The storing step may be implemented after the calculating step. A value of each pixel of the image may be stored as at least one of a gray level and in a color-coded way. Hence, the image calculated is stored to be analyzed later, for instance at another entity.

The data set may represent a frequency spectrum of a radiofrequency signal, wherein the first dimension represents a time-dependency of the frequency spectrum, wherein the second dimension represents the frequency-dependency of frequency spectrum, and wherein the plurality of values are indicative of at least one of an amplitude, a power and an energy associated to frequency components constituting the radiofrequency signal. Thus, the user is allowed to choose and set the resolution of the calculated image representing spectral data of the radiofrequency signal. For instance, the zoom level of the image with respect to the time axis, and the zoom level with respect to the frequency axis may be set independently from each other and the respective resolutions may be freely chosen by a user.

The data set may represent a frequency spectrum measured, namely a frequency spectrum (pre-)processed by a receiver or rather a measurement module.

Alternatively, the data set may represent a frequency spectrum directly obtained from an antenna system so that the data set corresponds to raw data received by the antenna system.

In other words, it is possible to carry out the zooming only on the time axis represented by the image and not on the frequency axis represented by the image, or it is possible to carry out the zooming only on the frequency axis represented by the image and not on the time axis represented by the image. It is also possible to choose any possible ratio between the resolution of the image with respect to the time axis thereof and the resolution of the image with respect to the frequency axis thereof.

According to an embodiment, the method comprises the step of dividing the image in tiles, wherein each tile comprises a first predefined number of pixels in the direction of the x-axis and a second predefined number of pixels in the direction of the y-axis. The tile is a pre-calculated part of the image. Generally, a tile of an image may be calculated independently from other tiles of the image. Thus, a tile may be displayed as soon as all pixels comprised in the tile have been calculated. In consequence, a user viewing the calculated image does not have to wait until all pixels comprised in the image have been calculated. In other words, the image is subdivided into tiles. Due to the tiles, zooming and/or scrolling in the image can be done in an uninterruptible manner.

Generally, zooming and/or scrolling may correspond to navigating through the visualized data set. Hence, navigating through the data is simplified as it can be done in an uninterruptible manner.

In some embodiments, the whole data set provided is used for calculating several tiles which in turn provide the image as the representation of the data. In some embodiments, the data set relates to frequency and time data (spectrum data) of the radiofrequency signal.

Accordingly, zooming and/or scrolling in the entire time/frequency range of the spectrum data can be done in an uninterruptible manner due to the calculated tiles.

Generally, the number of tiles and/or the size of each tile depend(s) on the zoom level used, for example the first resolution value and/or the second resolution value.

The method may further comprise at least one of storing, by a storage medium, and displaying, by a display, at least one tile of the image once every pixel value of the respective tile has been calculated. Thereby, a user who wishes to view the calculated image is able to start to view parts of the image, i.e. the tiles the pixels of which have already been calculated, while the other parts of the image are still being calculated, i.e. the tiles the pixels of which have not yet been calculated. Thus, a user is able to sooner start analyzing the image or the frequency spectrum of a signal represented by the image.

Furthermore, the storage capacity required can be reduced by storing the tiles instead of the raw data of the data set.

Several tiles may be calculated that establish the image, and wherein the tiles have the same size. Accordingly, the number of pixels in the respective direction is the same for each tile. The overall image may be subdivided into same sized tiles. Zooming, scrolling as well as calculating the image, for example the tiles, is simplified appropriately.

According to an embodiment, the method comprises the steps of parsing the plurality of values of the data set in at least one of the first dimension and the second dimension for predefined features of the data set in at least one of the first dimension and the second dimension, determining, for at least one parsed feature, a respective feature size value as a number of values indicative of the at least one parsed feature in at least one of the first dimension and the second dimension, and calculating a desired minimal feature size value based on the at least one determined feature size value and a number of pixels comprised in the image in the direction of at least one of the x-axis and the y-axis. The providing step may comprise the step of providing the desired minimal feature size value as at least one of the first resolution value and the second resolution value of the image. Thereby, it is ensured that a relatively small signal in the first dimension or the second dimension of the data set compared to other signals included in the spectral data, or relatively small features of a signal in the first dimension or the second dimension included in the spectral data are still visible in the calculated image and may therefore be analyzed. Here, the term "visible" means that the signal or feature of a signal is represented by a minimal number of pixels of the calculated image, wherein the minimal number may be predefined.

According to an embodiment, the method further comprises the step of providing at least one of two first resolution values and two second resolution values, and the step of calculating a first image based on one of the two first resolution values or the two second resolution values and calculating a second image based on the other one of the two first resolution values or the two second resolution values. At least two images having different resolution values may be calculated. As mentioned above, each of the images may comprise several tiles which in turn have several pixels.

For instance, different images may be (pre-)calculated that have different ratios of the axes or rather different zoom levels. The different images may relate to zoom levels that concern only the first axis, only the second axis or rather both axes.

The method may further comprise a step of storing the first image and the second image. Thereby, for a given data set, at least two images having at least two different resolution values in the x-axis direction or the y-axis direction are calculated and stored. A user may then freely select which image to display. Furthermore, the different zoom levels of the image are already calculated so that the user can gather the respective information directly. The respective image is then immediately displayed to the user and does not have to be calculated after the user has selected the respective resolution value. Thus, a waiting time for the user is avoided.

The at least two images may have a different number of tiles. Alternatively or additionally, the number of pixels per tile is different in both images (pre-)calculated.

The providing step may comprise the step of independently selecting, by a user, at least one of the first resolution value and the second resolution value. Thereby, the user is able to freely choose the resolution of the image to be calculated with respect to the data set, i.e. the zoom level, in the x-axis direction and the y-axis direction. For example, the user is able to only change the first resolution, or is able to only change the second resolution.

The first resolution value and the second resolution value may indicate a respective zoom level of the image calculated or to be calculated.

Moreover, there is provided a method of zooming into an image representing spectral data of a radiofrequency signal, the method comprising the steps of: receiving a first zooming value indicative of at least one of a first resolution value and a second resolution value of an image, displaying the image having the first resolution value or the second resolution value, receiving a second zooming value indicative of at least one of another first resolution value and another second resolution value of the image, and displaying the image having the another first resolution value or the another second resolution value.

Further, there is provided a system configured to implement the method according to the aforementioned method.

Still further, there is provided a data processing device comprising a processor adapted to perform the aforementioned method.

Furthermore, there is provided a computer-readable storage medium comprising instructions which, when executed by a computer, cause the computer to carry out the aforementioned method.

Finally, there is provided a computer program comprising instructions which, when the program is executed by a computer or a processor, cause the computer or the processor to carry out the aforementioned method.

Effects of the present disclosure should not be understood as being limited to the aforementioned objects. Other unmentioned effects may be clearly understood by the person skilled in the field based on the following description and the appended claims.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
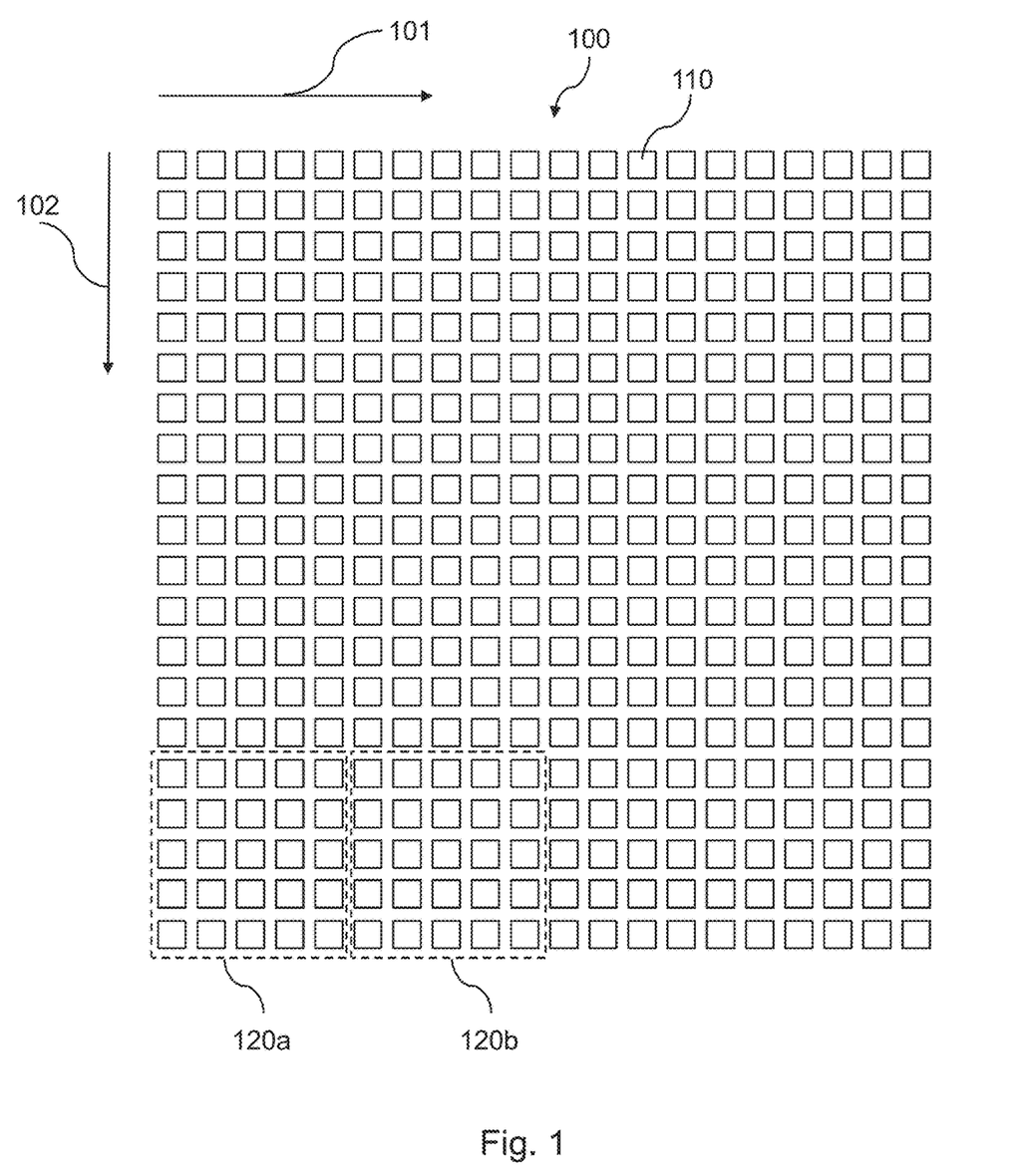
FIG. 1 illustrates a schematic overview of an image calculated by a method according to the present disclosure.

FIG. 1 illustrates a schematic overview of an image calculated to be displayed. The image 100 may be a digital image that may be stored in any known way, e.g. in a RAM storage or a hard disk drive or a solid state drive of a computer. Moreover, the image 100 may be displayed in any known way, e.g. on a monitor.

Generally, the image 100 comprises a plurality of pixels 110 constituting the image 100 as schematically shown in FIG. 1. The plurality of pixels 110 is arranged in matrix form or grid pattern along two dimensions 101 and 102 of the image 100. The dimensions 101 and 102 may also be referred to as axes or sides of the image 100. One dimension of the two dimensions 101, 102, e.g. the dimension 101 may be referred to as the x-axis, horizontal direction or row, and the other one of the two dimensions 101, 102, e.g. the dimension 102, may be referred to as the y-axis, vertical direction or column, but they are not limited thereto. The dimensions 101 and 102 may be arranged perpendicularly to each other, as shown in FIG. 1, but may have any angle there between.

According to an embodiment, a portion or part of the plurality of pixels 110 may be grouped as a tile 120a, 120b. In other words, the image 100 may be divided into a plurality of tiles 120a, 120b which may be (pre-)calculated. Here, dividing means a logical dividing for further processing. The tiles 120a, 120b shown in FIG. 1 are adjacently arranged in in the image 100. The tiles 120a, 120b may have the same size. Thus, each tile 120a, 120b is composed of the same number of pixels 110.

The plurality of pixels 110 may represent a value of any kind. After the image 100 has been calculated, the value of each pixel of the plurality of pixels 110 may be visually displayed. E.g., the values may be displayed as a gray level. Thus, pixels 110 having different values may have a different gray level when displayed. Another way of visualizing the pixels 110, i.e. the image 100, is to visualize the value of each pixel 110 as a color. That is, pixels 110 having different values may have a different color when displayed. In general, each pixel may have a color code.

Accordingly, the image has three dimensions, namely the first dimension (x-axis), the second dimension (y-axis) and the third dimension (color or rather gray level).

In any case, by displaying the image 100 and thereby visualizing different values represented by the plurality of pixels 110, features of the data or the data set represented by the values may be quickly and easily recognized by a user.

For example, in case the calculated image 100 represents spectral data of a radiofrequency signal, a user may quickly recognize or determine features of the represented radiofrequency signal.

Figure 2:
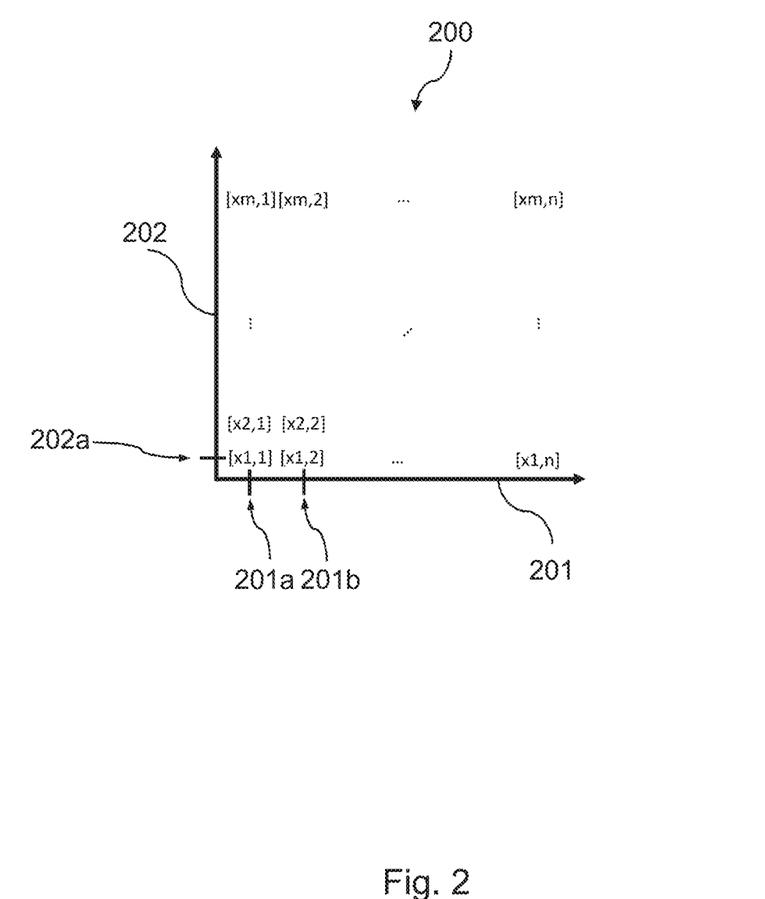
FIG. 2 illustrates spectral data of a radiofrequency signal used by a method according to the present disclosure.

FIG. 2 illustrates spectral data of a radiofrequency signal. The spectral data 200 comprises a plurality of values x1,1 to xm,n denoted by the indexes m and n, wherein m and n are two different natural numbers. The respective values may be measured or rather sampled. Moreover, the respective values may be directly obtained or rather directly received by an antenna system. The plurality of values may have at least dimensions 201 and 202, namely in the direction of the x-axis, for instance time, and in the direction of the y-axis, for instance frequency.

The spectral data 200 may be obtained by Fourier transforming a radiofrequency signal over time. In this case, each value of the plurality of values represents a weight, such as an amplitude, power or energy, associated by the Fourier transformation to each frequency component constituting the radiofrequency signal. In other words, the plurality of values represents a distribution of those weights, amplitude, power or energy with respect to the frequency components.

Thus, the one dimension 202 may represent this distribution and may also be referred to as the frequency dimension of the data set 200.

Since the distribution may change over time, the distribution may be different for each point in time. In other words, the distribution may be time-dependent. Thus, the spectral data 200 contains different distributions for different points in time. In that sense, the other dimension 201 represents the time-dependency of the distribution and may also be referred to as the time dimension of the data set 200.

For example, for two different points in the direction of the dimension 201, i.e. to two different points of time 201b and 201b, there exist two different pluralities of values, i.e. two different distributions x1,1 to xm,1 and x1,2 to xm,2, respectively. Similarly, for one point 202a in the direction of the dimension 202, that is the point 202a represents a frequency component of the radiofrequency signal, there are different values x1,1 to x1,n associated to this frequency component. That is, the weight, amplitude, power or energy varies over time.

The data set 200 may also be regarded as having three dimensions, wherein each value of the data 200 set is assigned to three dimensions which are visualized by the direction of the x-axis, the direction of the y-axis and a color code of an image as shown in FIG. 1.

The data set 200, namely its plurality of values, may be visualized appropriately. However, more values may be sampled than can be displayed on the respective display.

Figure 3:
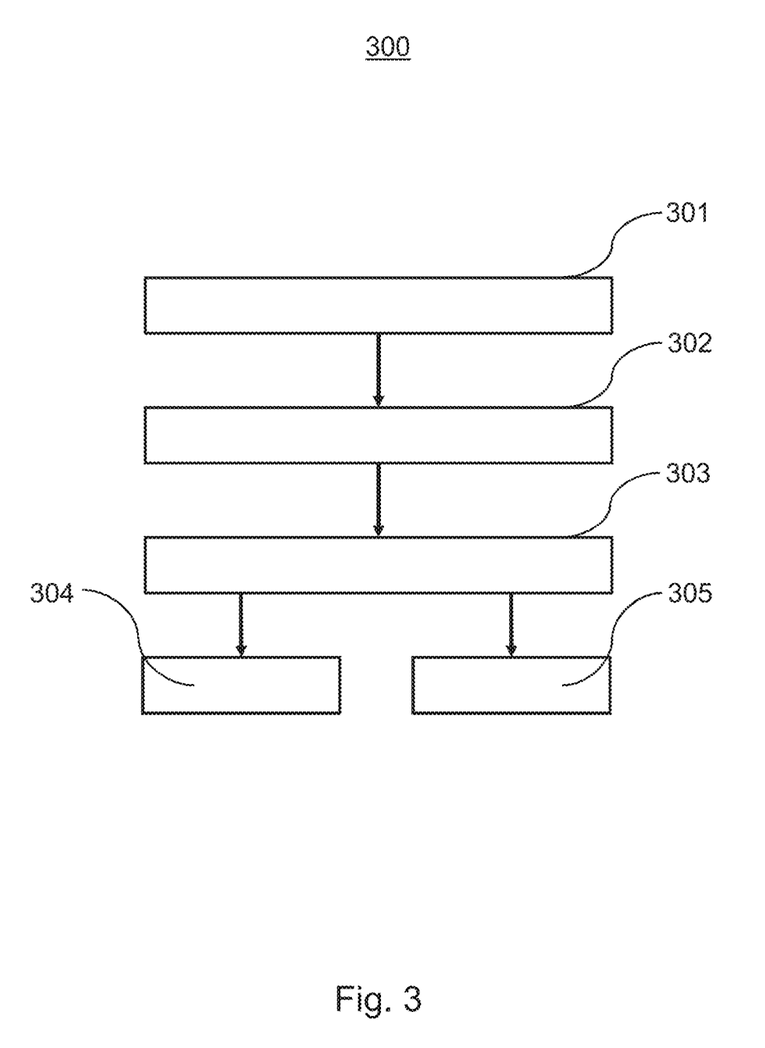
FIG. 3 is a flow diagram illustrating a method according to a first variant of the present disclosure.

FIG. 3 is a flow diagram illustrating a method according to a first embodiment of the present disclosure. By performing the method 300 shown in FIG. 3, a data set is visualized as an image. The method 300 may be performed or implemented by any type of known computer, computer system or processing entity.

The image to be calculated may comprise a plurality of pixels arranged in a matrix form in direction of an x-axis and y-axis of the image and the data set may comprise a plurality of values as described with respect to FIG. 1. Each value of the plurality of values may be associated to a respective point in a first dimension of the data set, and a respective point in a second dimension of the data set, respectively.

According to an embodiment, the method 300 uses the spectral data 200 described above with reference to FIG. 2 and calculates the image 100 described above with reference to FIG. 1 that shall be displayed on a display having an x-axis and a y-axis. In fact, the x-axis and the y-axis are assigned to the first dimension and the second dimension, respectively.

The method 300 comprises a first step 301 of providing a first resolution value for the image to be calculated and a second resolution value for the image to be calculated. The first resolution value and the second resolution value indicate a number of values included in the data set in the first dimension and in the second dimension, respectively, which will be represented by each pixel in the image to be calculated.

Based on the first resolution value and the second resolution value, the image is calculated as a representation of the data set as will be described hereinafter.

It is important to note that the first resolution value and the second resolution value are independent from each other and may be freely chosen. In other words, it does not exist a fix ratio with respect to the resolution values assigned to the different dimensions.

By way of example, with respect to the image of FIG. 1 and the data set of FIG. 2, the x-axis of the image 100 may represent the time dimension of the data set 200 and the y-axis of the image 100 may represent the frequency dimension of the data set 200.

Accordingly, the first dimension, namely the x-axis, represents a time-dependency of the frequency spectrum. The second dimension, namely the y-axis, represents the frequency-dependency of the frequency spectrum. The plurality of values are indicative of at least one of an amplitude, a power and an energy associated to frequency components constituting the radiofrequency signal wherein the amplitude, the power and/or the energy associated to frequency components is displayed by a color code.

Further, by way of example, a pixel 110 of the image 100 to be calculated may represent 5 values in the first direction 201 of the data set 200, i.e. in the time dimension thereof, and 10 values in the second direction 202 of the data set 200, i.e. in the frequency dimension thereof.

The method 300 further comprises the step 302 of determining, for each pixel of the image, a corresponding subset of values included in the data set. Here, a number of values comprised in the determined corresponding subset corresponds to a product of the first resolution value and the second resolution value. For example, in reference to above example, the number of values is 50. That is, each pixel represents a number of 50 values received, measured or rather sampled that are comprised in the data set. The method 300 thus determines a subset of 50 values comprised in the data set to be represented by a pixel in the image to be calculated.

According to an embodiment, the subsets corresponding to pixels that are arranged adjacently to each other in the image are determined to be adjacently arranged in the data set. For example, 50 values of the data set corresponding to a first pixel, and 50 values of the data set corresponding to a second pixel, wherein the first pixel and the second pixel are arranged adjacently to each other in the image to be calculated, are adjacently arranged in the data set with respect to the first dimension or the second dimension of the data set.

Next, the method 300 further comprises the step 303 of calculating, for each pixel, a pixel value based on the values comprised in the corresponding subset of the data set. That is, the image calculated in this way is a representation of the data set and the first dimension and the second dimension of the data set are represented by the x-axis and the y-axis of the calculated image.

According to an embodiment, the pixel value is calculated as an average of a portion or all values comprised in the subset of values corresponding to the respective pixel and determined in the determining step 302. Alternatively, the respective maximum or minimum may be used for the respective pixel value.

According to an embodiment, the method 300 comprises after the calculating step a displaying step 304 of displaying the calculated image. The displaying may be implemented by a display such as computer monitor, laptop display, smartphone display or the like. The displaying step 304 visualizes the pixel values calculated previously. Thus, the values of each pixel of the calculated image are displayed as a gray level or a color according to known techniques.

Further, the method 300 may comprise, after the calculating step, a storing step 305 of storing the calculated image. The storing step 305 may be implemented by a storing device such as a computer storage, storage card, or other computer readable medium or the like.

Figure 4:
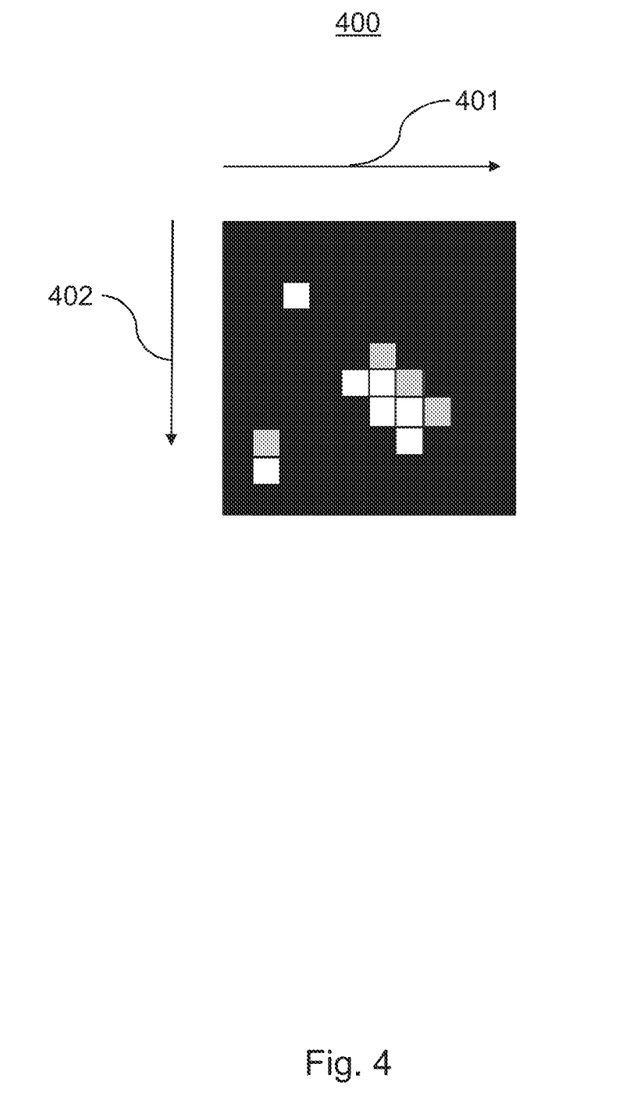
FIG. 4 illustrates an example of an image calculated by the method according the first variant of the present disclosure.

FIG. 4 illustrates an example of an image calculated by the method according the first variant of the present disclosure. As can be seen from FIG. 4, the calculated image 400 comprises a plurality of pixels arranged in the direction of the x-axis 401 representing the time of the frequency spectrum and in the direction of the y-axis 402 representing the frequency of the frequency spectrum.

In more detail, the calculated image 400 comprises 10 pixels arranged in the x-axis direction 401 and 10 pixels arranged in the y-axis direction 402 so that the calculated image 400 comprises 100 pixels in total.

One can distinguish three different gray levels of the pixels which represent the respective pixel values, namely the third dimension of the image calculated. That is, the image 400 comprises black, white and grey pixels.

Figure 5:
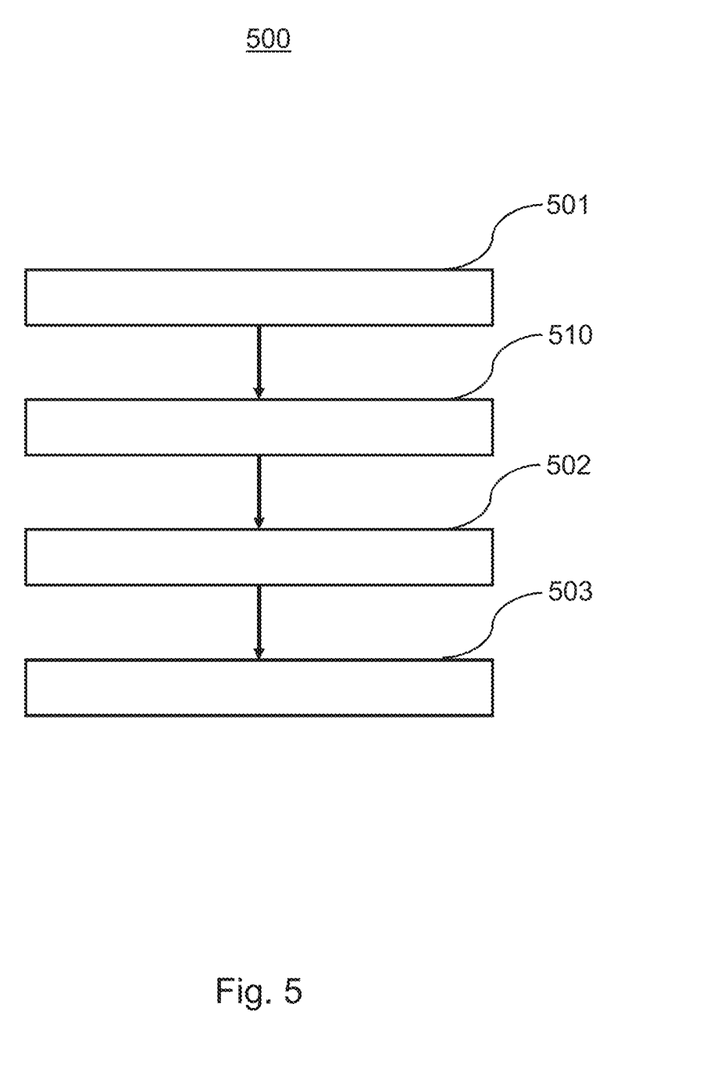
FIG. 5 is a flow diagram illustrating a method according to a second variant of the present disclosure.

FIG. 5 is a flow diagram illustrating a method according to an embodiment of the present disclosure. The method 500 of FIG. 5 comprises a providing step 501, a determining step 502 and a calculating step 503. These steps substantially correspond to the providing step 301, the determining step 302 and the calculating step 303 of the method 300 according to the first embodiment of FIG. 3, respectively, and a description thereof will be omitted here as reference is made to the description above.

Further, the method 500 comprises, prior to the calculating step 503 a dividing step 510. In the diving step, the image to be calculated is logically divided into several tiles.

According to the embodiment, the image to be visualized may be divided into tiles corresponding to tiles 120a and 120b of image 100 of FIG. 1 discussed above.

Each tile may comprise a first predefined number of pixels in the x-axis direction and a second predefined number of pixels in the y-axis direction. In fact, the different tiles may be of the same size so that each tile has the same number of pixels in the x-axis direction and in the y-direction.

Subsequently to the dividing step, the determining step 502 and the calculating step 503 may be carried out. These steps may be carried out in such a way that the pixels comprised in a given tile are calculated before the pixels of another tile are calculated. In this way, the pixel values of the image are calculated tile by tile.

In addition, the size and/or the number of the tiles 120a, 120b depend(s) on the respective resolution values.

Further, the determining step 502 and the calculating step 503 may be carried out in a way that tiles that are adjacently arranged in the image are successively calculated.

The method 500 may further comprise a storing step of storing each tile similar to the storing step described with reference to the third variant of FIG. 3. The respective storage capacity required can be reduced appropriately since the tiles are stored instead of the raw data.

The method 400 may also further comprise a displaying step of displaying each tile similar to the displaying step described with reference to the third variant of FIG. 3.

Zooming and scrolling in an image established by several tiles is simplified since the respective tiles are already calculated so that it is not necessary to calculate the zoomed or rather scrolled image. In other words, zooming or rather scrolling is possible in an uninterruptible manner.

The displaying step may be implemented in a way that each tile is displayed once, in other words as soon as, all pixels of the respective tile has been calculated in the calculating step. In this way, a user who wishes to view the calculated image is able to start to view parts of the image, i.e. the tiles the pixels of which have already been calculated, while the other parts of the image are still being calculated, i.e. the tiles the pixels of which have not yet been calculated. Thus, a user is able to sooner start analyzing the image or the frequency spectrum of a signal represented by the image.

Figure 6:
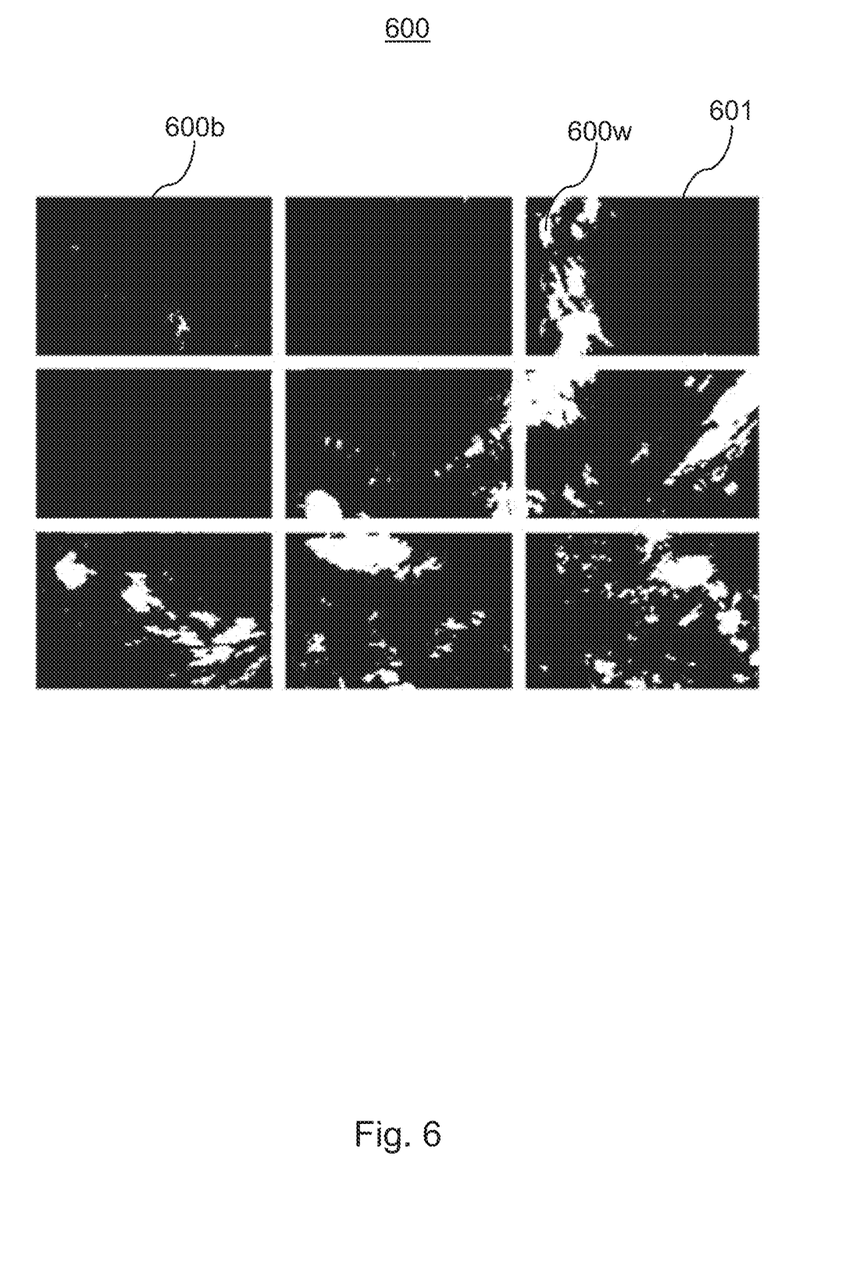
FIG. 6 illustrates an example of an image calculated by the method according the second variant of the present disclosure.

FIG. 6 illustrates an example of an image calculated by the method according the yet another embodiment. The image 600 calculated by the method according to this embodiment of the present disclosure comprises nine tiles visualized or arranged in a grid pattern.

Similar to the image 400 of FIG. 4 different gray levels can be recognized. In the image 600, there exist regions 600*b* with black pixels and regions 600*w* with mostly white pixels. For example, the black pixels represent values of spectral data wherein the values are smaller than a predetermined threshold value.

Similarly, the white pixels represent values of spectral data wherein the values are greater than the predetermined threshold value. By visualizing the spectral data in that way, features of the radiofrequency signal associated to the spectral data may be recognized. For example, there may be recognized frequency components or frequency bands where the signal has a high power. Similarly, it may be recognized whether and where the spectral composition of the radiofrequency signal changes over time.

In general, each value of the data set used for visualizing is assigned to three dimensions, namely the direction of the x-axis, the direction of the y-axis and a color code.

Figure 7:
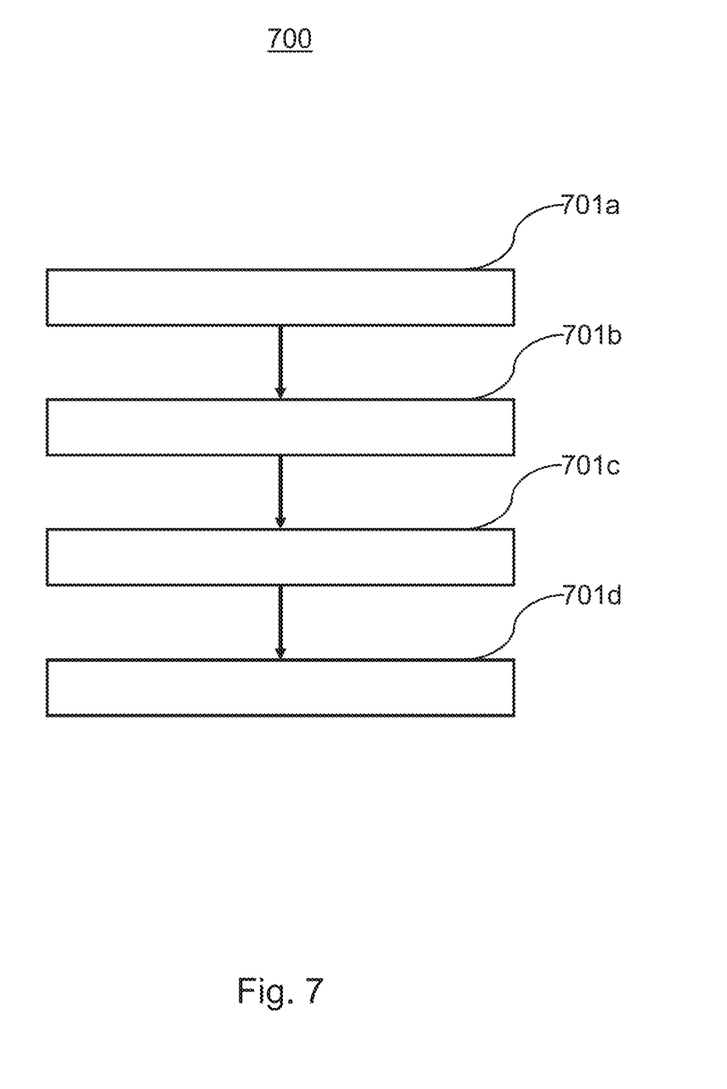
FIG. 7 is a flow diagram illustrating a method according to a third variant of the present disclosure.

FIG. 7 is a flow diagram illustrating a method according to still yet another embodiment of the present disclosure. The method 700 according to this embodiment as illustrated in FIG. 7 comprises a determining step and a calculating step. These steps are similar to the determining steps and the calculating steps described herein with regard to the first variant and the second variant and a detailed description thereof will be omitted here as reference is made to the explanations given above. The method 700 also comprises a providing step 701*d* which is different and will be described in the following. The method 700 may also use a data set 200 as described in reference to FIG. 2.

The method 700 comprises, prior to the providing step 701*d*, a step 701*a* of parsing a plurality of values comprised in a data set in at least one of the first direction and the second dimension of the data set for predefined features of the data set in at least one of the first direction and the second dimension.

For example, the data set 200 is parsed in the frequency dimension for a frequency feature of the respective radiofrequency signal. A frequency feature may be a group of values of the data set adjacent to each other in the frequency dimension which are all greater than a certain predefined threshold value. In the parsing step 701*a*, the data set 200 is parsed for groups of values which satisfy this condition in order to determine the features. There may exist one or several of such features in the data set 200. In the parsing step, a location of each such feature may also be determined.

The method 700 further comprises a step 701*b* of determining, for at least one of the parsed features, a respective feature size value. The feature size value of a parsed feature may be defined as a number of values indicative of the at least one parsed feature in at least one of the first dimension and the second dimension. In other words, the determining step 702*b* determines the size as a number of values of the parsed features. For example, in the determining step 702*b*, the method 700 may determine the size of a parsed feature as 10. That is, a parsed feature comprises 10 values in the frequency dimension that are greater than the predefined threshold value. The respective feature size value may be defined for all or for certain parsed features.

Next, the method 700 comprises a step 701*c* of calculating a desired minimal feature size value based on the at least one determined feature size value and a number of pixels comprised in the image in the direction of at least one of the x-axis and the y-axis. For example among all respective feature size values determined in step 701*b*, the smallest feature size value is determined. For example, the smallest respective feature size value may be 5. That is, the smallest feature satisfying above condition (a group of values of the data set adjacent to each other in the frequency dimension which are all greater than a certain predefined threshold value).

It is then decided that the smallest feature visible in the image to be calculated must have a size of at least k pixels of the image in the x-axis direction or in the y-axis direction, wherein k is a natural number. For example, the frequency dimension of the data set is represented by the y-axis of the image and that the smallest feature satisfying the above condition must be visible as 1 pixel of the image in the y-axis. In other words, the smallest feature having 5 adjacent values in the frequency dimension is represented by 1 pixel in the image to be calculated. Thus, the desired minimal feature size value is 5.

The method 700 then comprises the providing step 701*d*, wherein the providing step comprises the step of providing the desired minimal feature size value as at least one of the first resolution value and the second resolution value of the image.

In other words, the desired minimal feature size value calculated in the previous step 701*c* is provided as at least one of the first resolution value and the second resolution value of the image to be calculated. In the above example, the desired minimal feature size value 5 is provided by the method 700 as the first resolution value. Thereby, it is ensured that a feature present in the data set and subject to analysis by a user is represented by a sufficiently large number of pixels in the calculated image in order to be recognized by the user.

Figure 8:
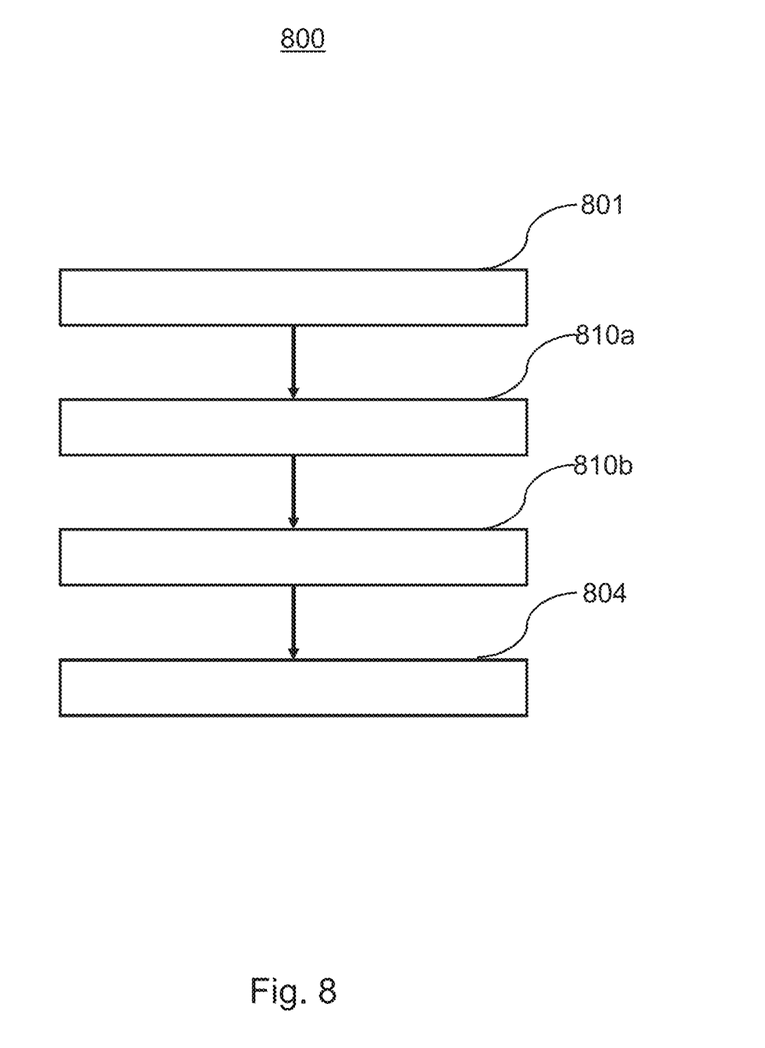
FIG. 8 is a flow diagram illustrating a method according to a fourth variant of the present disclosure.

FIG. 8 is a flow diagram illustrating a method according to still another embodiment of the present disclosure. In the method 800 of FIG. 8, the method according to the first, second or third variant is carried out at least two times with at least two different first resolution values or at least two different second resolution values.

First, the method comprises a step 801 of providing at least two different first resolution values, or at least two different second resolution values.

FIG. 8 shows a case where the method 800 comprises a step 810*a* of carrying out any one of the methods according to the first, second or third variant with one of the at least two different first resolution value and a step 810*b* of carrying out the method according to the first, second or third variant with another one of the at least two different first resolution values.

At the end of step 810*b*, there exist at least two different calculated images which are then (at least temporarily) stored in step 804 in association with the respective first resolution value and the respective second resolution value in order to be later displayed to a user.

The user may then freely select which image to display. The user may select the respective image based on at least one of the first resolution value and second resolution value associated to the image or may directly select the desired image. The image is then immediately displayed to the user and does not have to be calculated while the user is waiting. Thus, a waiting time for the user is avoided.

In some embodiments, the above mentioned methods may be performed by a processor of a data processing unit, for instance a data processing unit with a display and/or a storage medium. Generally, a computer-readable storage medium may comprise instructions which, when executed by a computer, cause the computer to carry out the method(s) described above.

It should also be understood that each block of the block diagrams, flowchart illustrations, method steps described herein, and combinations of blocks in the block diagrams, flowchart illustrations and method steps described herein and/or illustrated in the FIGURES, could be implemented by special purpose hardware-based computer systems that perform the specified functions or operations, or combinations of special purpose hardware and computer instructions.

It should be understood that each block of any of the block diagrams, flowchart illustrations, and/or method step, respectively, and described herein and/or illustrated in the FIGURES may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks, method steps, etc. The term computer can include any processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

In an embodiment, the data processing devices and/or data processing units, etc., includes a microprocessor and a memory storing logic modules and/or instructions for carrying out the function(s) of these components, either separately or in any combination. In an embodiment, the data processing devices and/or data processing units, etc., includes one or more ASICs having a plurality of predefined logic components. In an embodiment, the data processing devices and/or data processing units, etc., includes one or more FPGA having a plurality of programmable logic components. In an embodiment, the data processing devices and/or data processing units, etc., includes hardware circuit implementations (e.g., implementations in analog circuitry, implementations in digital circuitry, and the like, and combinations thereof). In an embodiment, the data processing devices and/or data processing units, etc., includes combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed. The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for visualizing a data set as an image on a display having an x-axis and a y-axis, said data set comprising a plurality of values, each value of said plurality of values being associated to a respective point in a first dimension and a respective point in a second dimension, wherein the first dimension and the second dimension are assigned to the x-axis and the y-axis, respectively, the method comprising the steps of:
   providing a first resolution value for said image in the direction of the x-axis and a second resolution value for said image in the direction of the y-axis, wherein said first resolution value and said second resolution value are independent from each other, and
   calculating, based on said first resolution value and said second resolution value, said image as a representation of said data set, wherein said image is divided in tiles, wherein said image comprises a plurality of pixels arranged in a matrix form in direction of the x-axis and in direction of the y-axis, said first resolution value and said second resolution value being indicative of a number of values of said data set in the first dimension and in the second dimension, respectively, to be represented by each pixel in the calculated image, wherein the calculating step comprises the steps of:
   determining, for each pixel, a corresponding subset of values comprised in said data set, wherein a number of values comprised in said corresponding subset corresponds to a product of said first resolution value and said second dimension value, and
   calculating, for each pixel, a pixel value based on values comprised in said corresponding subset.

2. The method of claim 1, wherein each value of said data set is assigned to three dimensions which are visualized by the direction of the x-axis, the direction of the y-axis and a color code of said image.

3. The method of claim 1, wherein the value range of at least one of the x-axis and the y-axis is unlimited.

4. The method of claim 1, wherein a pixel value is calculated as an average of at least two values comprised in said corresponding subset.

5. The method of claim 1, wherein, in the determining step, two subsets of values corresponding to two pixels arranged adjacently to each other in said image are adjacently arranged in said data set.

6. The method of claim 1, further comprising, after the calculating step, at least one of displaying, by a display, and storing, by a storage medium, said image, wherein a value of each pixel of the image is at least one of displayed and stored as at least one of a gray level and in a color-coded way.

7. The method of claim 1, wherein said data set represents a frequency spectrum of a radiofrequency signal, wherein the first dimension represents a time-dependency of said frequency spectrum, wherein the second dimension represents the frequency-dependency of said frequency spectrum, and wherein the plurality of values are indicative of at least one of an amplitude, a power and an energy associated to frequency components constituting said radiofrequency signal.

8. The method of claim 1, wherein the method further comprises at least one of storing, by a storage medium, and displaying, by a display, at least one tile of said image once every pixel value of said respective tile has been calculated.

9. The method of claim 1, wherein several tiles are calculated that establish the image, and wherein the tiles have the same size.

10. The method of claim 1, further comprising:
parsing said plurality of values of said data set in at least one of the first dimension and the second dimension for predefined features of said data set in at least one of the first dimension and the second dimension;
determining, for at least one parsed feature, a respective feature size value as a number of values indicative of said at least one parsed feature in at least one of the first dimension and the second dimension;
calculating a desired minimal feature size value based on the at least one determined feature size value and a number of pixels comprised in said image in the direction of at least one of the x-axis and the y-axis,
wherein the providing step comprises the step of providing the desired minimal feature size value as at least one of the first resolution value and the second resolution value of said image.

11. The method of claim 1, wherein the providing step comprises the step of providing at least one of two first resolution values and two second resolution values, and
wherein the calculating step comprises the step of calculating a first image based on one of said two first resolution values or said two second resolution values and calculating a second image based on the other one said two first resolution values or said two second resolution values, and
further comprising a step of storing said first image and said second image.

12. The method of claim 1, wherein the providing step comprises the step of independently selecting, by a user, at least one of said first resolution value and said second resolution value.

13. The method of claim 1, wherein each tile comprises a first predefined number of pixels in the direction of the x-axis and a second predefined number of pixels in the y-axis.

14. A method for visualizing a data set as an image on a display having an x-axis and a y-axis, said data set comprising a plurality of values, each value of said plurality of values being associated to a respective point in a first dimension and a respective point in a second dimension, wherein the first dimension and the second dimension are assigned to the x-axis and the y-axis, respectively, the method comprising the steps of:
providing a first resolution value for said image in the direction of the x-axis and a second resolution value for said image in the direction of the y-axis, wherein said first resolution value and said second resolution value are independent from each other,
calculating, based on said first resolution value and said second resolution value, said image as a representation of said data set, wherein said image is divided in tiles, and
after the calculating step, at least one of displaying, by a display, and storing, by a storage medium, said image, wherein a value of each pixel of the image is at least one of displayed and stored as at least one of a gray level and in a color-coded way.

15. A method for visualizing a data set as an image on a display having an x-axis and a y-axis, said data set comprising a plurality of values, each value of said plurality of values being associated to a respective point in a first dimension and a respective point in a second dimension, wherein the first dimension and the second dimension are assigned to the x-axis and the y-axis, respectively, the method comprising the steps of:
providing a first resolution value for said image in the direction of the x-axis and a second resolution value for said image in the direction of the y-axis, wherein said first resolution value and said second resolution value are independent from each other,
calculating, based on said first resolution value and said second resolution value, said image as a representation of said data set, wherein said image is divided in tiles, and
wherein said data set represents a frequency spectrum of a radiofrequency signal, wherein the first dimension represents a time-dependency of said frequency spectrum, wherein the second dimension represents the frequency-dependency of said frequency spectrum, and wherein the plurality of values are indicative of at least one of an amplitude, a power and an energy associated to frequency components constituting said radiofrequency signal.

* * * * *